(12) United States Patent
Domingos

(10) Patent No.: US 11,814,236 B2
(45) Date of Patent: Nov. 14, 2023

(54) SLEEVE FOR CUPS AND OTHER CONTAINERS

(71) Applicant: Jared Domingos, Scotia, NY (US)

(72) Inventor: Jared Domingos, Scotia, NY (US)

( * ) Notice: Subject to any disclaimer, the term of this patent is extended or adjusted under 35 U.S.C. 154(b) by 298 days.

(21) Appl. No.: 17/199,795

(22) Filed: Mar. 12, 2021

(65) Prior Publication Data

US 2022/0289463 A1    Sep. 15, 2022

(51) Int. Cl.
*B65D 81/38* (2006.01)
*B32B 3/10* (2006.01)
*A47K 10/16* (2006.01)
*B32B 29/00* (2006.01)

(52) U.S. Cl.
CPC .......... *B65D 81/3876* (2013.01); *A47K 10/16* (2013.01); *B32B 3/10* (2013.01); *B32B 29/005* (2013.01); *B32B 2307/304* (2013.01)

(58) Field of Classification Search
CPC . B65B 81/3886; B65B 81/3876; B65B 81/38; B65B 3/22; A47K 10/16; B32B 3/10; B32B 29/005; B32B 29/002; B32B 2307/304; B31C 7/00
USPC ................ 220/739, 737, 738, 903; 229/403; 206/812; 493/296
See application file for complete search history.

(56) References Cited

U.S. PATENT DOCUMENTS

| | | | | |
|---|---|---|---|---|
| 4,194,627 A * | 3/1980 | Christensen | ....... | B65D 81/3876 220/592.25 |
| 5,174,965 A * | 12/1992 | Jones | ...... | B01L 3/508 215/396 |
| 5,445,315 A * | 8/1995 | Shelby | ...... | B65D 81/3886 220/592.25 |
| 6,286,754 B1 * | 9/2001 | Stier | ...... | B65D 81/3881 229/4.5 |
| 8,668,109 B2 * | 3/2014 | Dickert | ...... | B65D 81/3876 220/737 |
| 2002/0000446 A1 * | 1/2002 | Taylor | ...... | A47G 11/001 220/739 |
| 2002/0185496 A1 * | 12/2002 | Puerini | ...... | A47G 23/0216 220/738 |
| 2009/0302047 A1 | 12/2009 | Anderson | | |
| 2012/0145732 A1 * | 6/2012 | Padek | ...... | B65D 25/2817 493/291 |
| 2012/0234846 A1 * | 9/2012 | Costanzo, Jr. | ....... | B65D 5/4266 493/405 |
| 2012/0318812 A1 * | 12/2012 | Leser | ...... | B29C 66/14 220/739 |
| 2013/0213986 A1 | 8/2013 | Couvelier | | |
| 2014/0038804 A1 * | 2/2014 | Konkin | ...... | B65D 81/3876 493/287 |

(Continued)

FOREIGN PATENT DOCUMENTS

WO    2019009812    1/2019

*Primary Examiner* — Robert J Hicks
(74) *Attorney, Agent, or Firm* — HESLIN ROTHENBERG FARLEY & MESITI PC; Kristian E. Ziegler, Esq.

(57) ABSTRACT

A cup sleeve includes a material folded into a shape adapted to receive a cup and to engage with an outer circumference of a cup. The material is adapted to provide thermal protection. The cup sleeve includes a first section having a selected number of layers of the material, and a second section having three times the selected number of layers of the material. A method of manufacturing the cup sleeve is also provided.

19 Claims, 25 Drawing Sheets

(56) References Cited

U.S. PATENT DOCUMENTS

| | | | |
|---|---|---|---|
| 2014/0151385 A1* | 6/2014 | Chun | B65D 81/3886 |
| | | | 220/738 |
| 2015/0291313 A1* | 10/2015 | Vara | B65D 23/085 |
| | | | 220/737 |
| 2017/0273485 A1 | 9/2017 | Rao | |

* cited by examiner

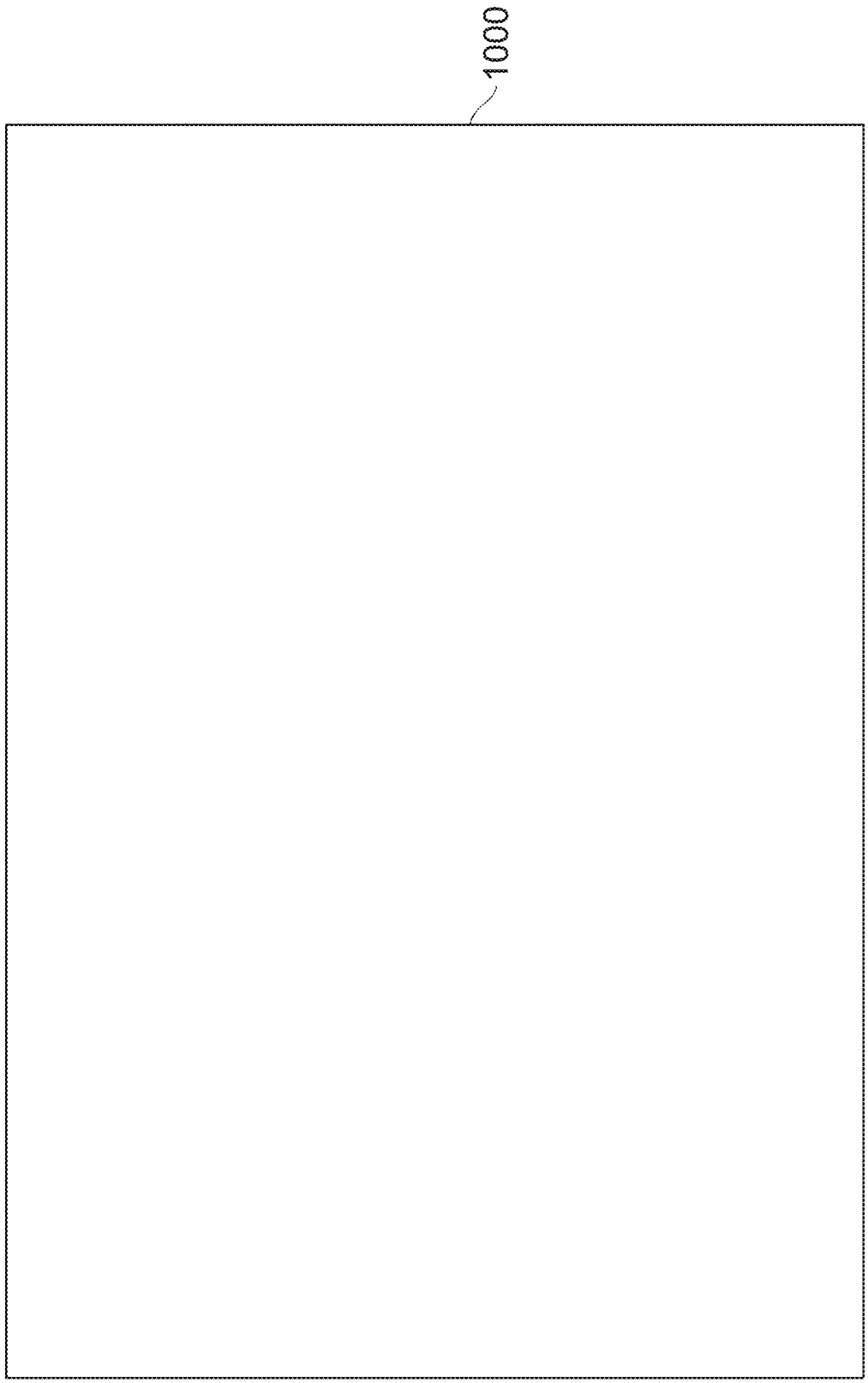

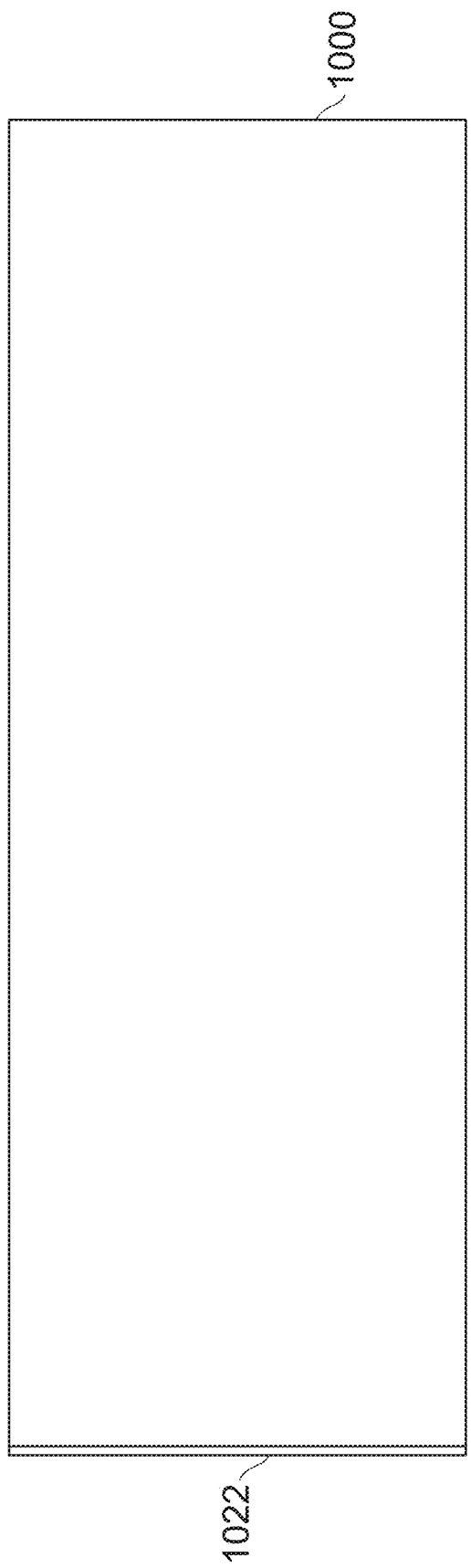

SLEEVE FOR CUPS AND OTHER CONTAINERS

TECHNICAL FIELD

The invention relates generally to food containers, and more particularly to a hot beverage cup sleeve that is adapted to receive a cup and allows a person to hold the cup without burning the person's hand.

BACKGROUND OF THE INVENTION

Cup sleeves are commonly used in coffee shops and restaurants around the world. Most disposable cups are too thin to provide adequate heat protection. Therefore, a cup sleeve is placed around a cup holding a hot beverage and makes it easier for a user to hold the cup. Existing cup sleeves are typically made of paperboard or similar material. Existing cup sleeves are single-use products with no other functions, and accordingly are typically discarded along with the cup. Many existing cup sleeves are manufactured or made from materials that have poor insulating properties. Alternatives such as double-walled cups or the use of two cups combined (known as "double-cupping") can be wasteful and expensive. Most existing cup sleeves also have a concave symmetrical shape that is not optimized to provide maximum insulation protection to the natural finger placement of the entire human hand carrying a to-go cup.

Many people, while holding a cup with a thermal protective sleeve, also use a napkin for additional heat protection, to absorb drips from a cup seam, and to soak up spills from an open spout. Lid plugs can also be used to prevent splashes from an open spout. The use of these multiple single-use products may be reduced by an absorbent cup sleeve that functions as a thermal barrier, serves as a napkin, and reduces the need for a lid plug.

SUMMARY OF THE INVENTION

In accordance with an embodiment, a cup sleeve includes a material folded into a shape adapted to receive a cup and to engage with an outer circumference of the cup. The material is adapted to provide thermal protection. The cup sleeve includes a first section having a selected number of layers of the material, and a second section having three times the selected number of layers of the material.

In one embodiment, the cup sleeve includes no adhesive material. The foldable material has absorbent properties. The cup sleeve is adapted to remain in the shape while engaged with the outer circumference of the cup, and the foldable material is further adapted to be unfolded into a second shape adapted to function as an absorbent paper towel.

In another embodiment, the cup sleeve has an upper edge having a first point and a second point, the second point being higher than the first point when the cup sleeve is engaged with the outer circumference of the cup or in a second folded position. The cup sleeve also has a section proximate the second point, when the cup sleeve is engaged with the outer circumference of the cup, the section being higher than the first point.

In another embodiment, the material comprises an absorbent material.

In another embodiment, the material has textured properties.

In another embodiment, the cup sleeve is formed from a material having a length between 12 and 14 inches and a width between 8 and 11 inches. For example, the cup sleeve may be formed from a material having a length of 13 inches and a width of 10 inches. Other dimensions may be used such as any dimension resulting in a folded material with two long sides and two short sides, having a length approximately to $2(W(Radical 3))+2(W)$, where W is the width of folded material resulting in a ratio of short side 1 to 5.464 long side or 0.183. In other words, the formula is $L=2(W\sqrt{3})+2W$, where L is length and W is width of the material.

In another embodiment, the cup sleeve has a first, folded position and a second, open position. The cup sleeve is adapted to receive a cup and engage with the outer circumference of the cup when in the second, open position.

In another embodiment, the second section includes a first portion of the material folded over a selected number of times to form an outer set of layers of the material and an inner set of layers of the material, and a second portion of the material inserted between the outer set of layers and the inner set of layers.

In accordance with another embodiment, a method is provided. A material is folded a selected number of times to produce a folded material having two long sides and two short sides. A triangular section of the folded material is defined, wherein the triangular section may have a first side having length W formed from a short side of the folded material, a second side formed from a portion of a long side of the folded material, the portion having length $W\sqrt{3}$, and a hypotenuse having length 2W. The intersection of the first side and the hypotenuse forms an angle which may be, for example, a 60 degree angle, and the intersection of the second side and the hypotenuse forms an angle which may be, for example, a 30 degree angle. The angles described herein are examples and are not limiting. Other angles may be used. The triangular section is folded over along the hypotenuse of the triangular section, to form a first folded-over section having a diagonal edge between the two long sides. The first folded-over section is folded over so that the diagonal edge of the first folded-over section aligns with a long side of the folded material, to form a second folded-over section having an outer set of layers and an inner set of layers. A second short side of the folded material opposite the second folded-over section is folded over. The second short side is inserted between the outer set of layers and the inner set of layers of the second folded-over section.

In one embodiment, the material includes an absorbent material. For example, the material may be a paper towel.

In another embodiment, the material has a length between 12 and 14 inches and a width between 8 and 11 inches. For example, the material may have a length of 13 inches and a width of 10 inches.

These and other aspects of the present Invention will be more fully understood by reference to one of the following drawings.

DETAILED DESCRIPTION OF THE INVENTION

In accordance with an embodiment, a cup sleeve includes a material folded into a shape adapted to receive a cup and to engage with an outer circumference of the cup. The material is adapted to provide thermal protection. The cup sleeve includes a first section having a selected number of layers of the material, and a second section having three times the selected number of layers of the material.

Figure 1:
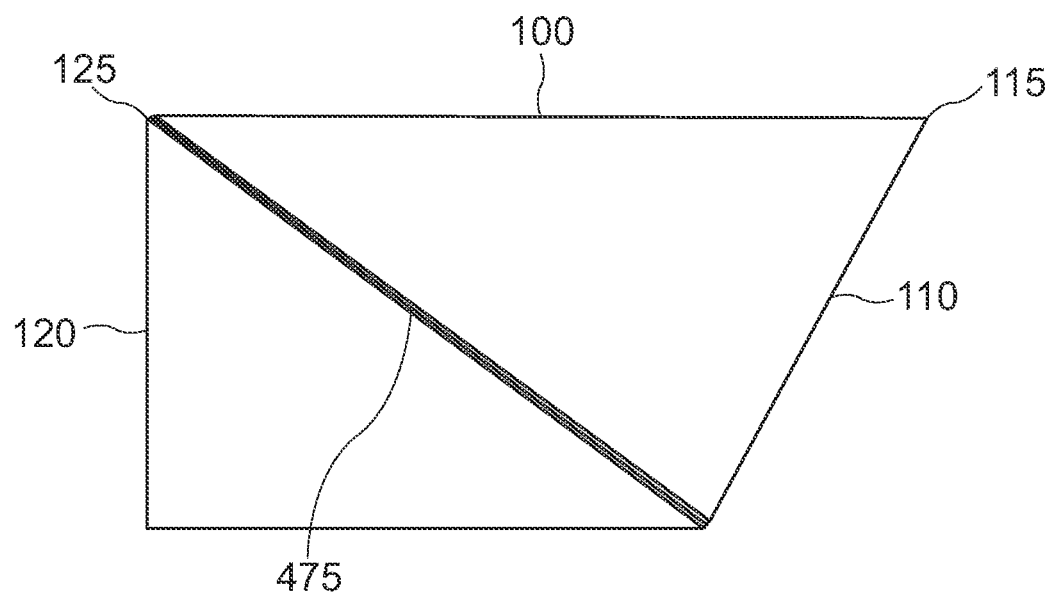
FIG. 1 shows a side view of a cup sleeve in a first closed position in accordance with an embodiment.

FIG. 1 shows a side view of a cup sleeve 100 in accordance with an embodiment. Cup sleeve 100 may include an absorbent material. For example, cup sleeve 100 may be formed of a paper material, such as a paper towel.

Cup sleeve 100 is shown in FIG. 1 in a first folded (closed) position. In the first folded position, cup sleeve 100 includes a side 120, a point 125, a side 110, and a point 115. In the first folded position, points 115 and 125 form corners. The sleeve may have edges of multilayer material 475, depicted by multiple parallel lines. The multilayer material 475 may or may not be visible in the first folded position of the cup sleeve 100.

Figure 2:
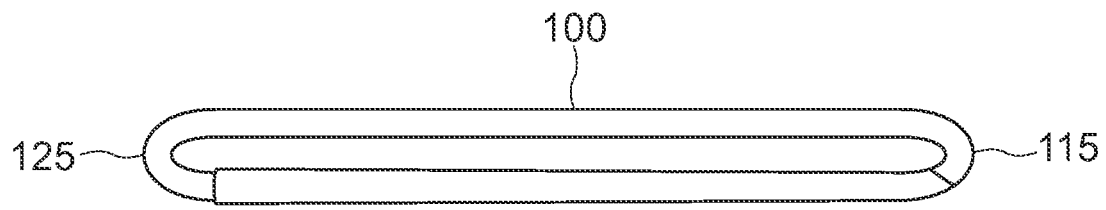
FIG. 2 shows a top view of the cup sleeve of FIG. 1 in the first closed position.

FIG. 2 shows a top view of cup sleeve 100 in the first folded (closed) position in accordance with an embodiment.

Figure 3:
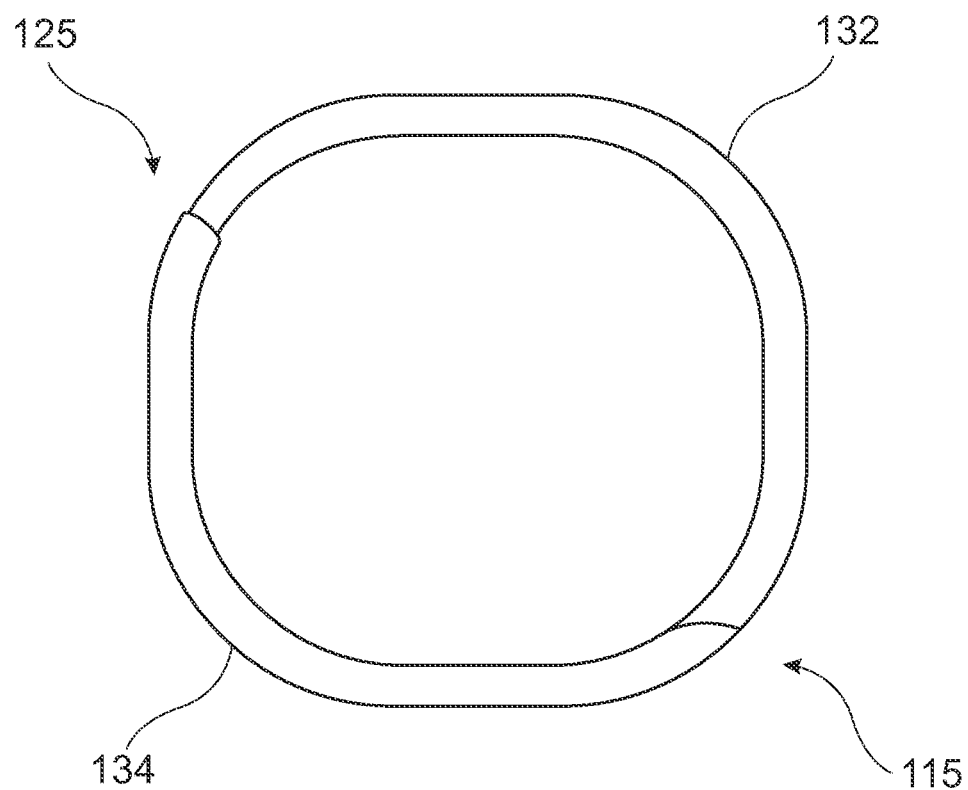
FIG. 3 shows a top view of the cup sleeve of FIG. 1 in an open position.

Cup sleeve 100 may be transformed from the first folded position into an open position, for example, by pressing on sides 120 and 110 when the cup sleeve is in the first folded position. This action creates an open top with a larger circumference than the open bottom; a cup then may be inserted through the open top and open bottom. FIG. 3 shows a top view of cup sleeve 100 in the open position in accordance with an embodiment. In the open position, cup sleeve 100 includes points 132 and 134 in addition to points 115 and 125.

Figure 4:
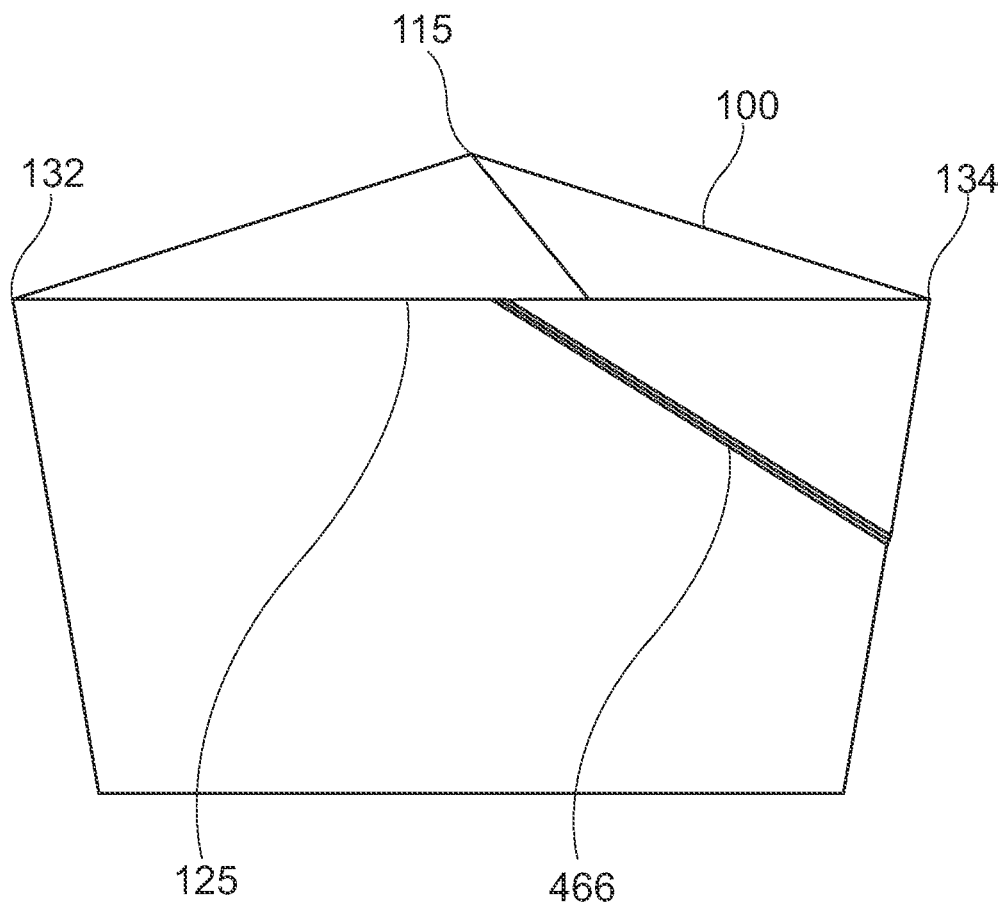
FIG. 4 shows a front view of the cup sleeve of FIG. 1 in a second closed position.

By pressing on points 115 and 125 (and/or their associated sides), cup sleeve 100 may be transformed from the open position to a second folded position. FIG. 4 shows a front view of cup sleeve 100 in the second folded (closed) position in accordance with an embodiment. Edge 125 is lower than point 115. In the Drawings, edges of multilayer material are depicted by multiple parallel lines. For example, in FIG. 4, edge 466 is an edge of multilayer material and therefore is depicted by multiple parallel lines.

Figure 5:
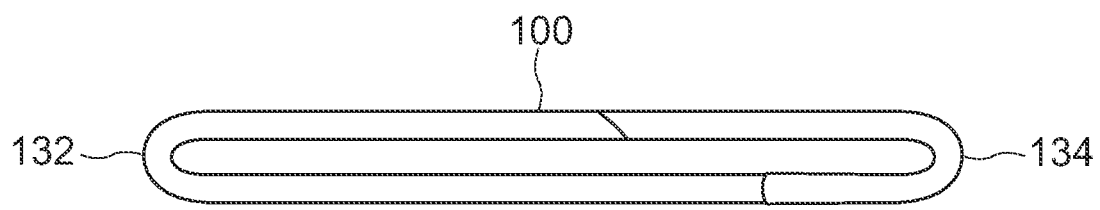
FIG. 5 shows a top view of the cup sleeve of FIG. 1 in the second closed position.

FIG. 5 shows a top view of cup sleeve 100 in the second folded (closed) position in accordance with an embodiment.

Figure 6:
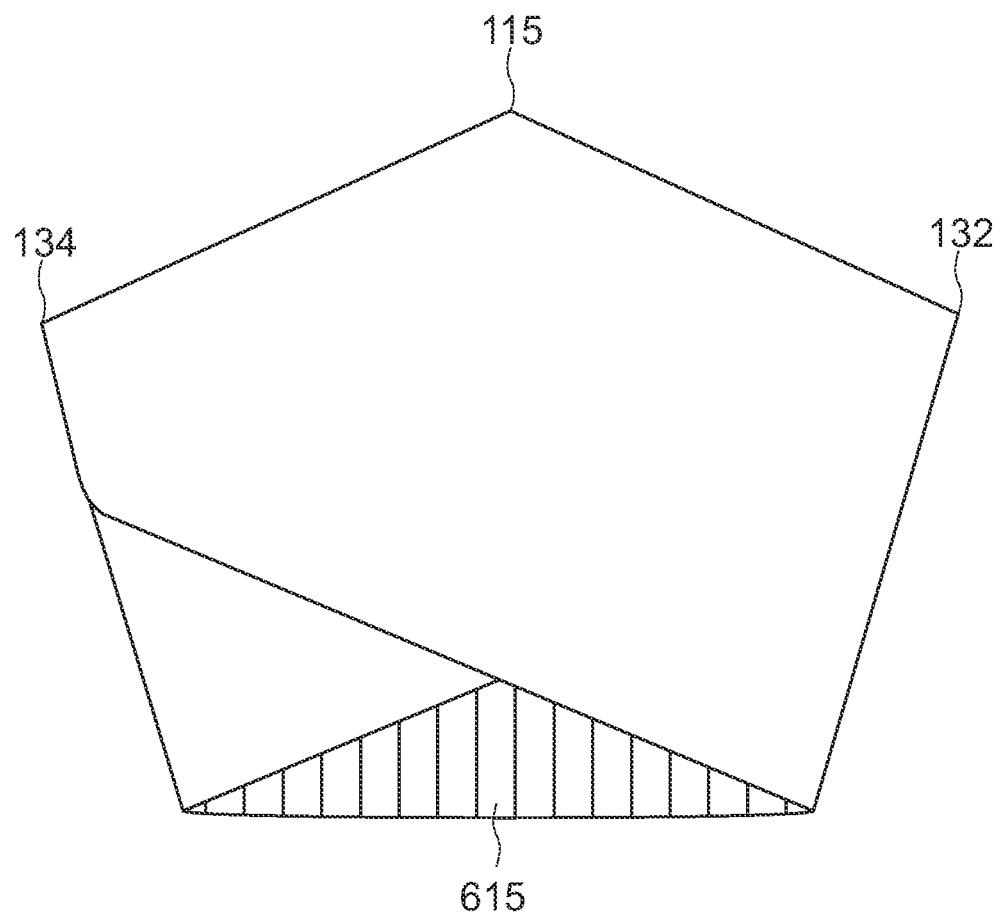
FIG. 6 shows a rear view of the cup sleeve of FIG. 1 in the second closed position.

FIG. 6 shows a rear view of cup sleeve 100 in the second folded (closed) position in accordance with an embodiment. A portion 615 of the reverse side of the front surface (shown in FIG. 4) of cup sleeve 100 is visible in FIG. 6.

Figure 7:
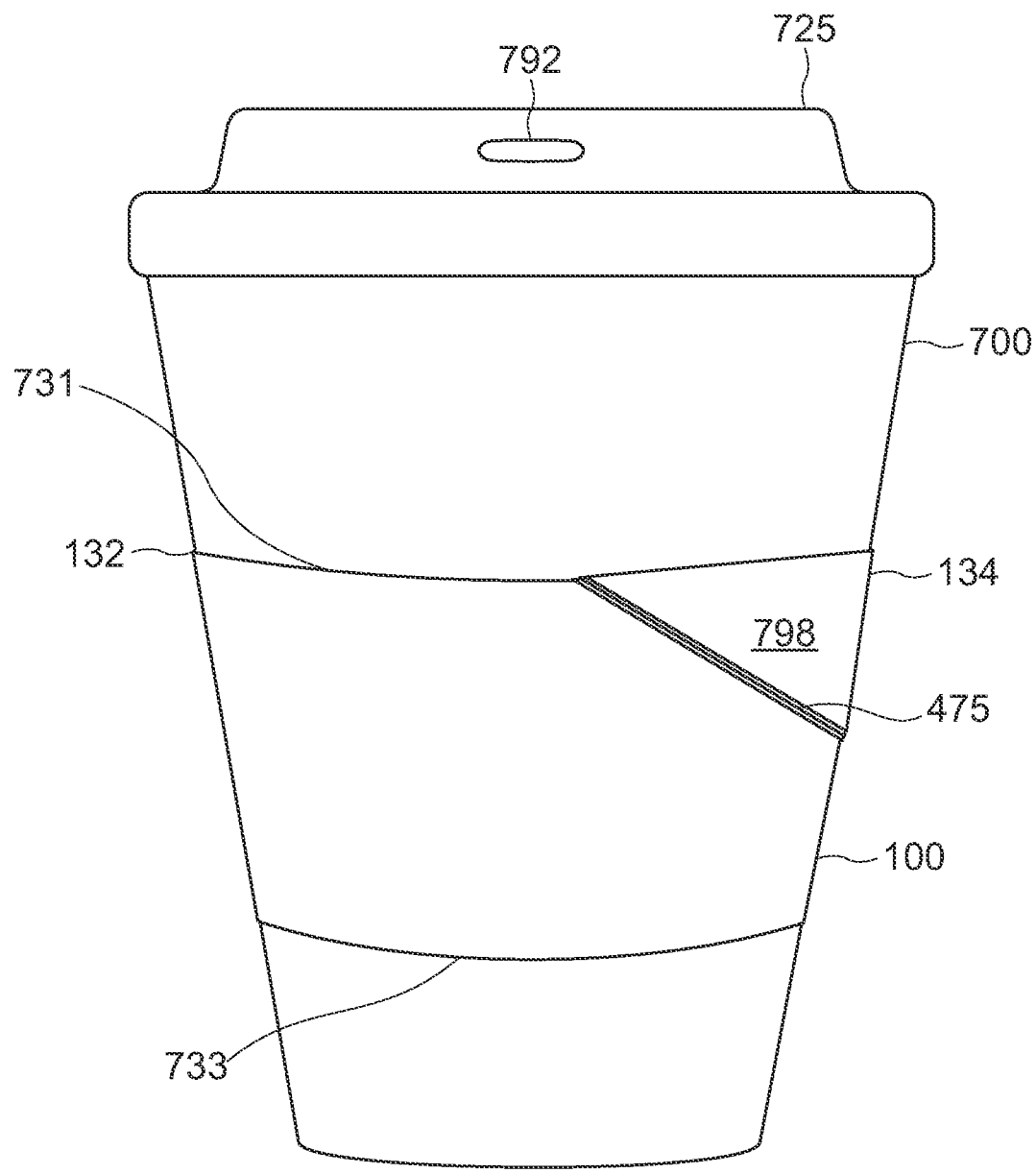
FIGS. 7A-7C show several views of a cup sleeve engaged with the outer circumference of a cup in accordance with an embodiment.
Figure 7:
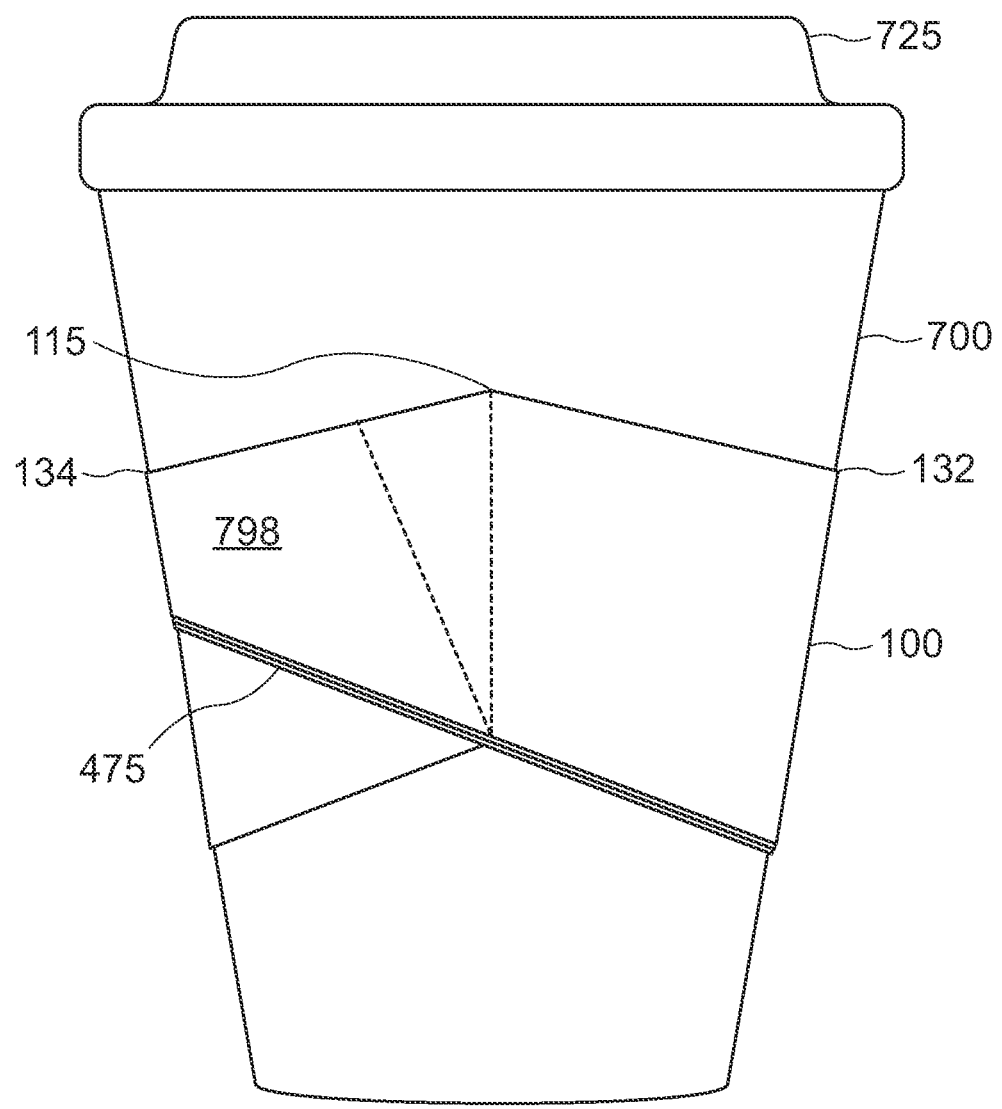
Figure 7:
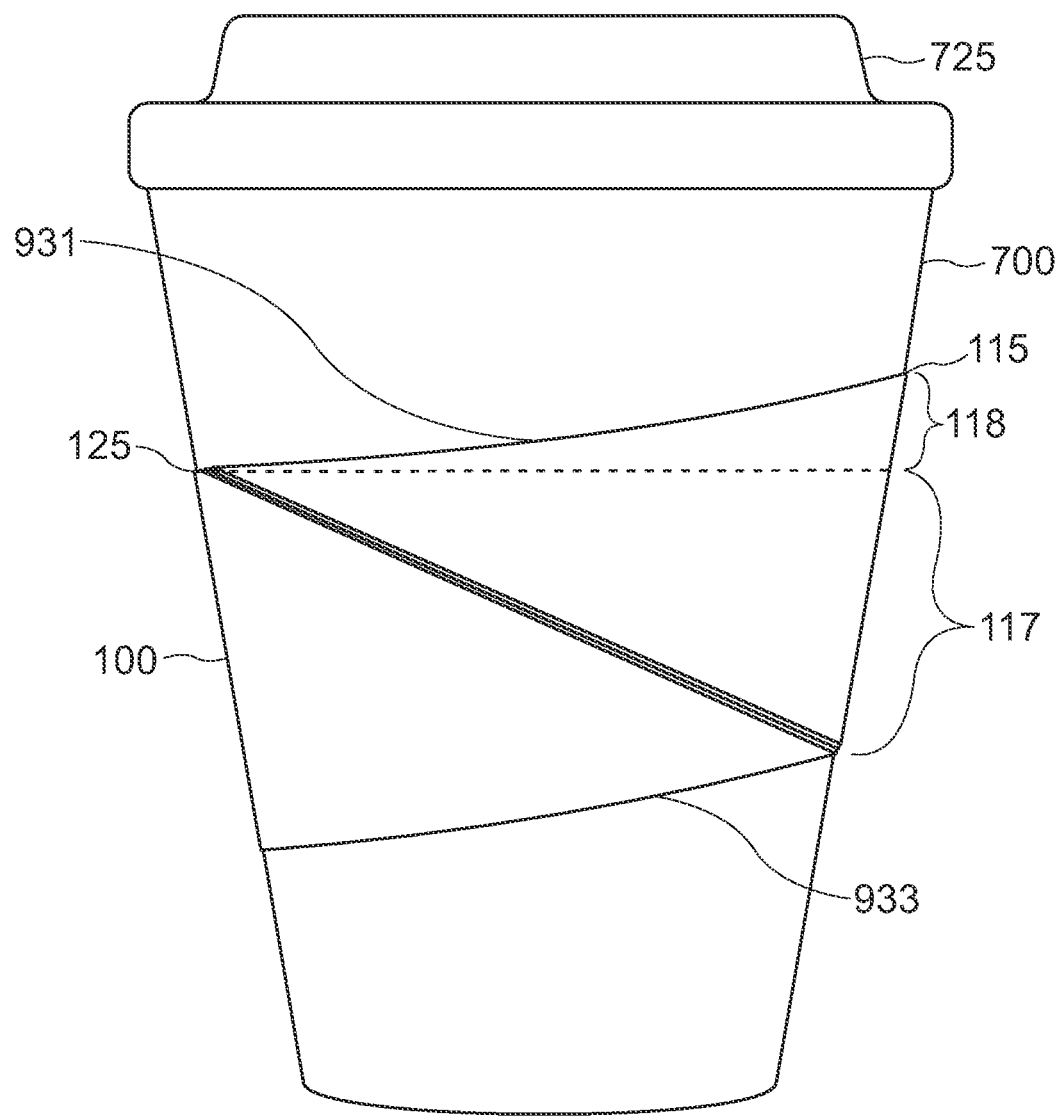
Figure 8:
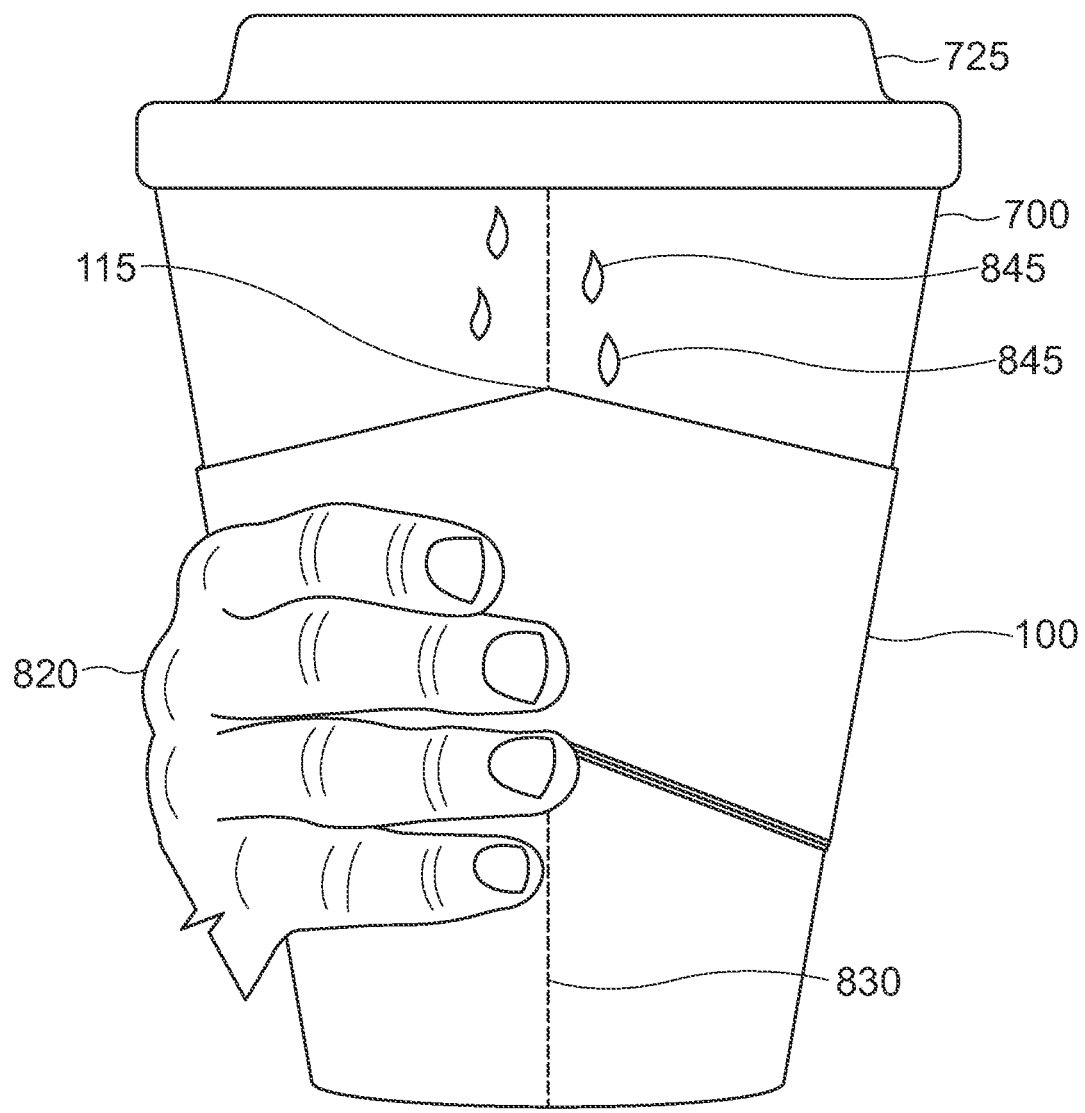
FIG. 8 shows a cup sleeve fitted onto a cup and held by a user's hand in accordance with an embodiment.
Figure 9:
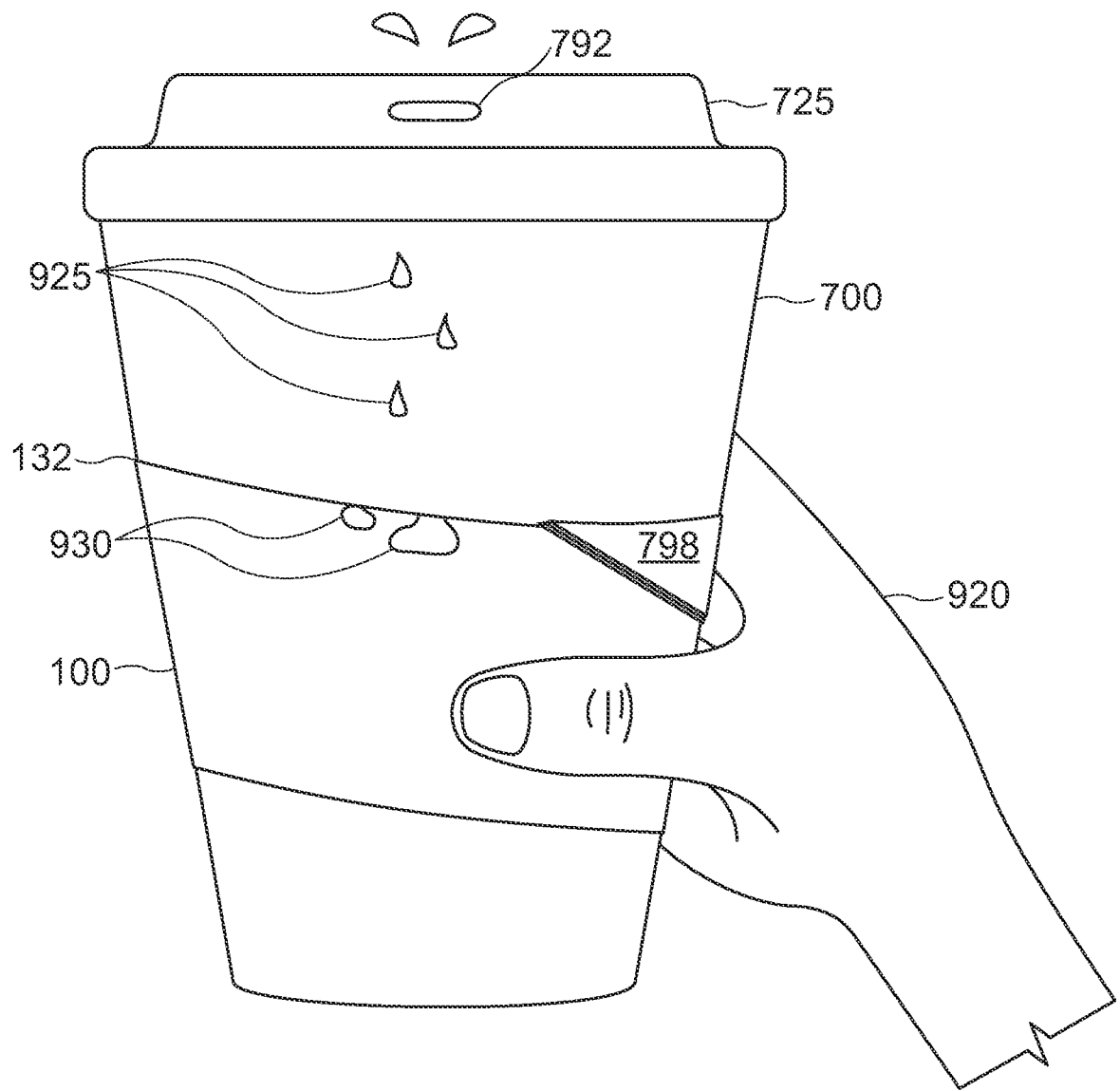
FIG. 9 shows a cup sleeve fitted onto a cup and held by a user's hand in accordance with an embodiment.

Cup sleeve 100 advantageously may receive and engage with cups of various sizes. FIGS. 7A-7C show several views of cup sleeve 100 engaged with the outer circumference of a cup 700 in accordance with an embodiment. Cup 700 has a lid 725. FIGS. 7-9 illustrate the construction and shape of cup sleeve 100 when the cup sleeve is fitted around a cup.

FIG. 7A shows a view of cup sleeve 100 engaged with the outer circumference of a cup 700 in accordance with an embodiment. Lid 725 is fitted onto cup 700. Lid 725 has a spout 792. Due to the construction of cup sleeve 100, cup sleeve 100 has a lower edge 733 and an upper edge 731 that are parallel to each other. Lower edge 733 and upper edge 731 also are not horizontal when cup 700 rests on a surface such as a table top.

In one embodiment, cup 700 has a conical frustrum shape. Cups and containers having other shapes and sizes may be used.

Cup sleeve 100 includes a region 798 which includes more layers of material, and therefore is thicker, than other portions of the cup sleeve. Advantageously, when cup 700 is held by a user, the extra thickness of region 798 provides added protection to a portion of the user's palm.

FIG. 7B shows another view of cup sleeve 100 engaged with the outer circumference of cup 700 in accordance with an embodiment. Point 115 is higher than points 132 and 134.

FIG. 7C shows another view of cup sleeve 100 engaged with the outer circumference of cup 700 in accordance with an embodiment. An upper edge 931 of cup sleeve 100 is not horizontal but rises from point 125 to point 115. Similarly, a lower edge 933 of cup sleeve 100 is not horizontal when engaged with cup 700. Cup sleeve 100 includes a first section 117 that extends around the cup. Cup sleeve 100 also includes a second section 118 proximate point 115 that is above section 117 and does not extend fully around the cup. For example, no part of section 118 is above point 125.

FIG. 8 shows cup sleeve 100 fitted onto cup 700 and held by a user's hand 820. A seam 830 of cup 100 is visible. It has been observed that droplets of a liquid tend to leak from a cup between the lid and the seam. In the illustrative embodiment, droplets 845 have leaked from cup 700 near seam 830 and are moving downward along the outer surface of cup 700 toward cup sleeve 100.

Advantageously, point 115 of cup sleeve 100 is higher than the user's hand 820; consequently, portions of cup sleeve 100 near point 115 absorb the droplets before the droplets contact the user's hand.

FIG. 9 shows cup sleeve 100 engaged with an outer circumference of cup 700 in accordance with another embodiment. A user's hand 920 grips cup sleeve 100 and cup 700. Droplets of liquid spill out from spout 792 of lid 725. Some of the droplets, such as droplets 925, move down the outer surface of cup 700 toward the user's hand 920. Advantageously, cup sleeve 100 absorbs the droplets before the droplets contact the user's hand. In the illustrative embodiment, stains 930 represent droplets that have been absorbed by cup sleeve 100.

It has been observed that many people hold a cup in such a way that portions of the user's open palm and/or thumb contact the cup at a location on the cup that is lower than the point(s) where the other four fingers contact the cup. As a result, the shape of existing cup sleeves provides inadequate insulation protection for the user's hand that results in uncomfortable and unnatural or awkward finger placement. Cup sleeve 100 advantageously provides not only natural finger placement for comfort and better grip, but has three times the number of layers of material in the section (for example, section 798 shown in FIG. 9) that is in direct contact with the holder's palm.

Advantageously, the protection provided by the cup sleeve described herein has been compared to that of other cup sleeves and shown to be superior to those examples. In particular, the outside wall of the inventive cup sleeve and that of various other cup sleeves were measured using an infrared heat thermometer. The procedure included the following steps. Cups having cup sleeves were filled with water heated to different temperatures. The cups were allowed to sit, allowing the cup sleeves to absorb any heat being transferred. The outside temperature of each cup sleeve was measured from 2 inches away using an infrared thermometer at different water temperatures measured with a digital thermometer inside the cup. The results showed that the inventive cup sleeve provides better protection qualities than most other alternatives. For example, the inventive cup sleeve provided better protection than corrugated sleeves, especially at points near the palm of the user's hand.

In one embodiment, cup sleeve 100 has a shape with edges non-parallel to the top and bottom edges of a conical frustum (cup). For example, FIGS. 7-9 illustrate how cup sleeve 100 conforms to the shape of the cup when fitted around the cup resulting in the edges of cup sleeve 100 not being parallel to the top and bottom edges/planars of the cup.

Figure 10:
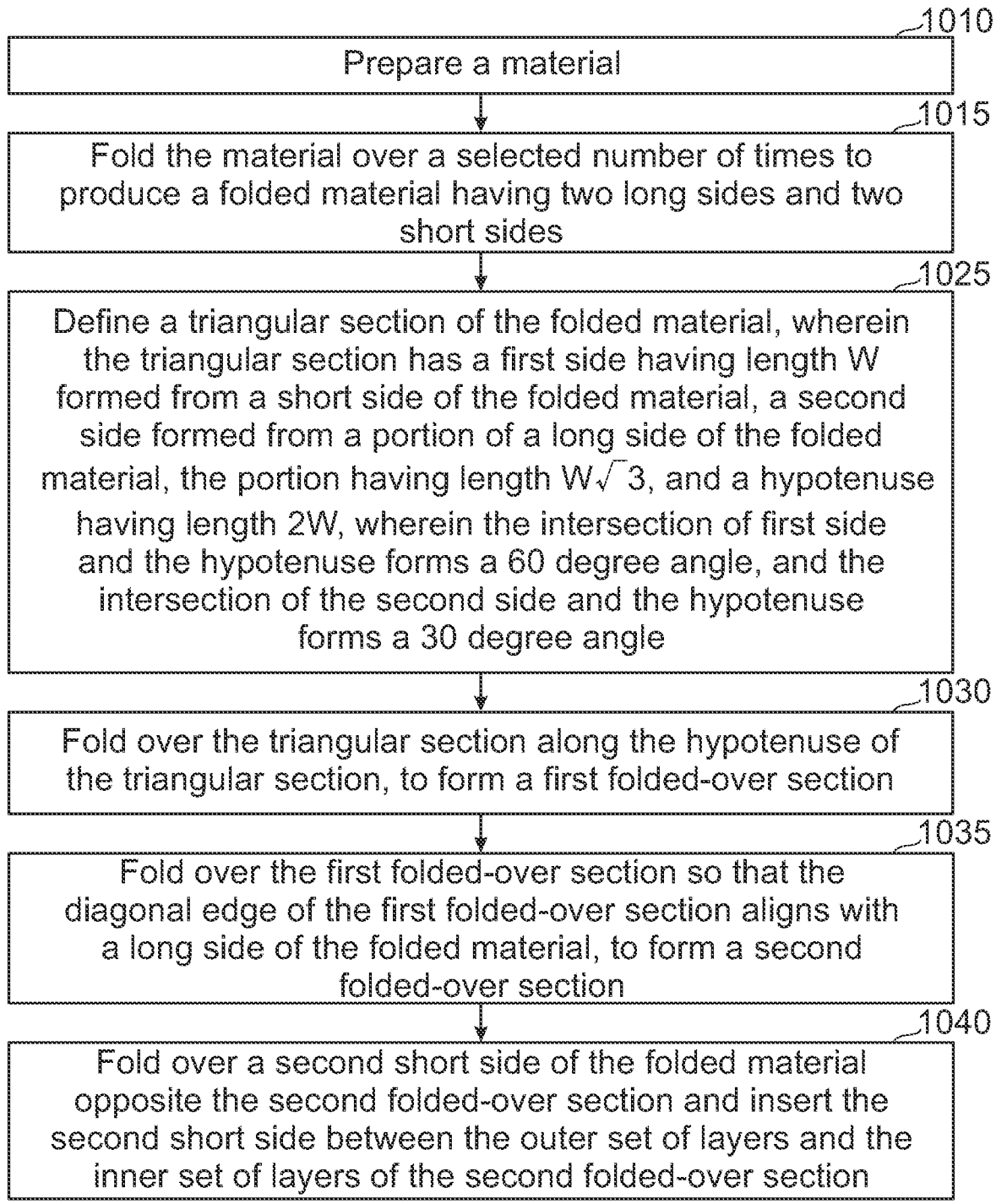
FIG. 10 depicts a method of manufacturing a cup sleeve in accordance with an embodiment.

FIG. 10 depicts a method of manufacturing a cup sleeve in accordance with an embodiment. The method of FIG. 10 is discussed herein with reference to FIGS. 11A-11L.

At step 1010, a material is prepared. In one embodiment, the material is an absorbent material such as a paper towel. The material may be prepared in any suitable manner. For example, the material may be placed on a surface. Other methods of preparation may be used.

Figure 11:
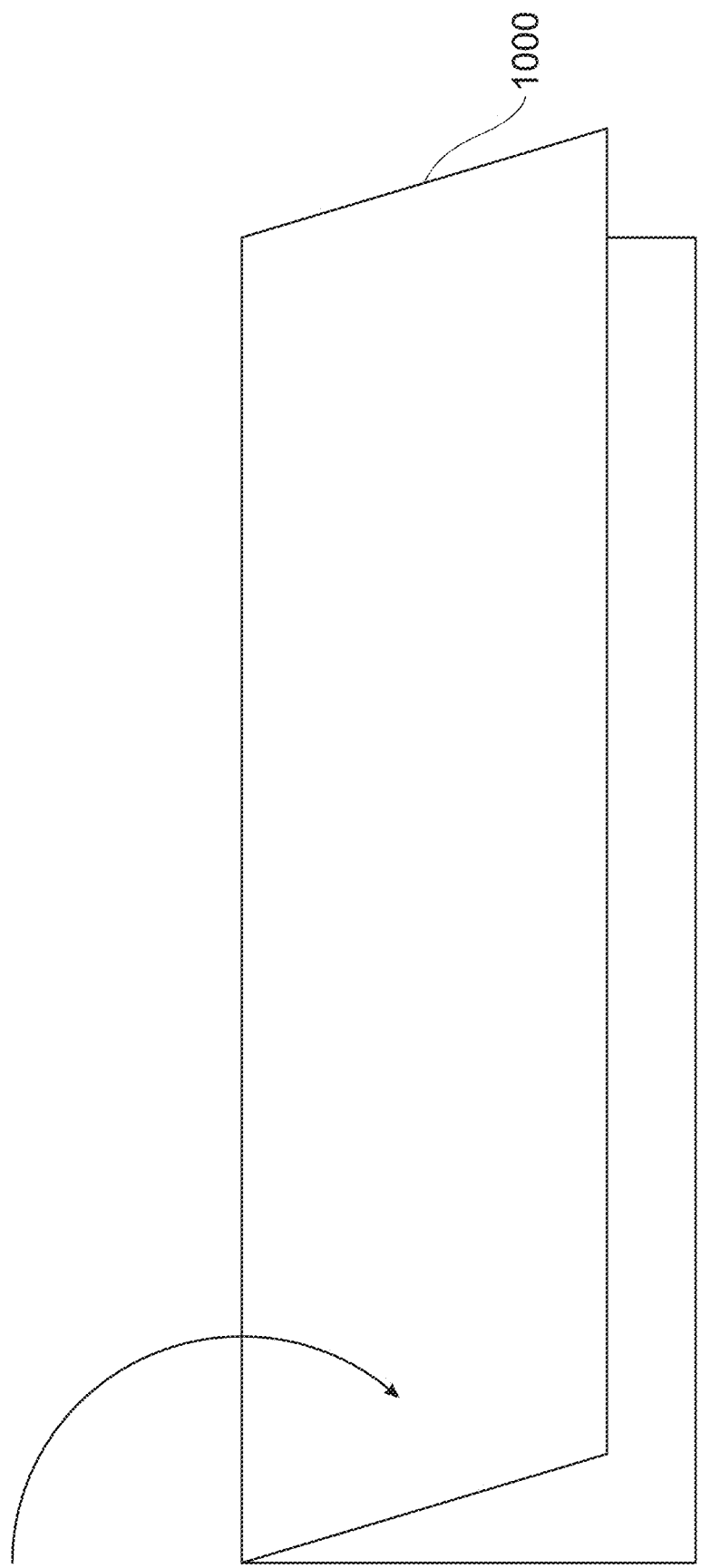
FIGS. 11A-11L show a piece of foldable material being formed into a cup sleeve in accordance with the method of FIG. 10.
Figure 11:
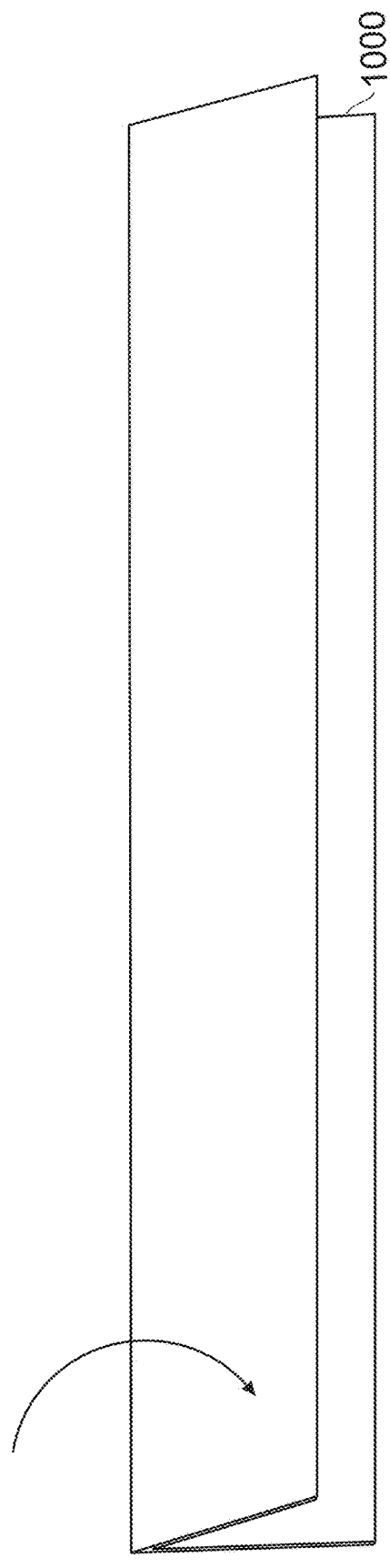
Figure 11:
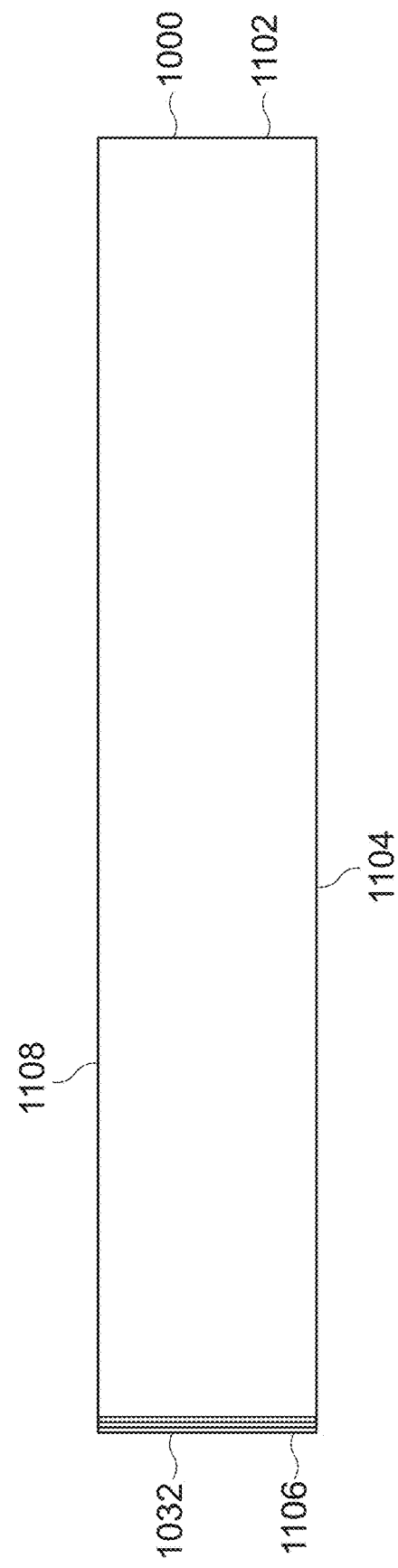

FIG. 11A shows a material 1000 in accordance with an embodiment. For example, material 1000 may be a paper towel comprising flexible, soft paper pulp.

In one embodiment, the material has textured properties. For example, a paper towel with raised grooves may be used, providing advantages such as improved gripability and improved thermal protection.

In one embodiment, a material having a length between 12 and 14 inches and a width between 8 and 11 inches may be used. For example, a material having a length of 13 inches and a width of 10 inches may be used. Other dimensions may be used.

At step 1015, the material is folded over a selected number of times to produce a folded material having two long sides and two short sides. In an illustrative example, material 1000 is first folded in half as shown in FIG. 11B. FIG. 11C shows material 1000 folded in half in accordance with an embodiment. Referring to edge 1022, folded material 1000 now has two layers and a thickness equal to twice the thickness of the original material (referred to as two-ply).

In the illustrative embodiment, material 1000 is again folded in half as shown in FIG. 11D. FIG. 11E shows material 1000 folded in accordance with an embodiment. Referring to edge 1032, folded material 1000 now has four layers and therefore has a thickness equal to four times the thickness of the original material (referred to as four-ply).

Folded material 1000 now has long sides 1104 and 1108 and short sides 1102 and 1106.

In other embodiments, material 1000 may be folded a different number of times and may be folded using a different method. A material may be folded a selected number of times to produce a folded material having more or fewer than four layers of material. For example, a material may be folded to produce a folded material having three layers of the material and a thickness equal to three times the thickness of the original material (three-ply).

Figure 11F:
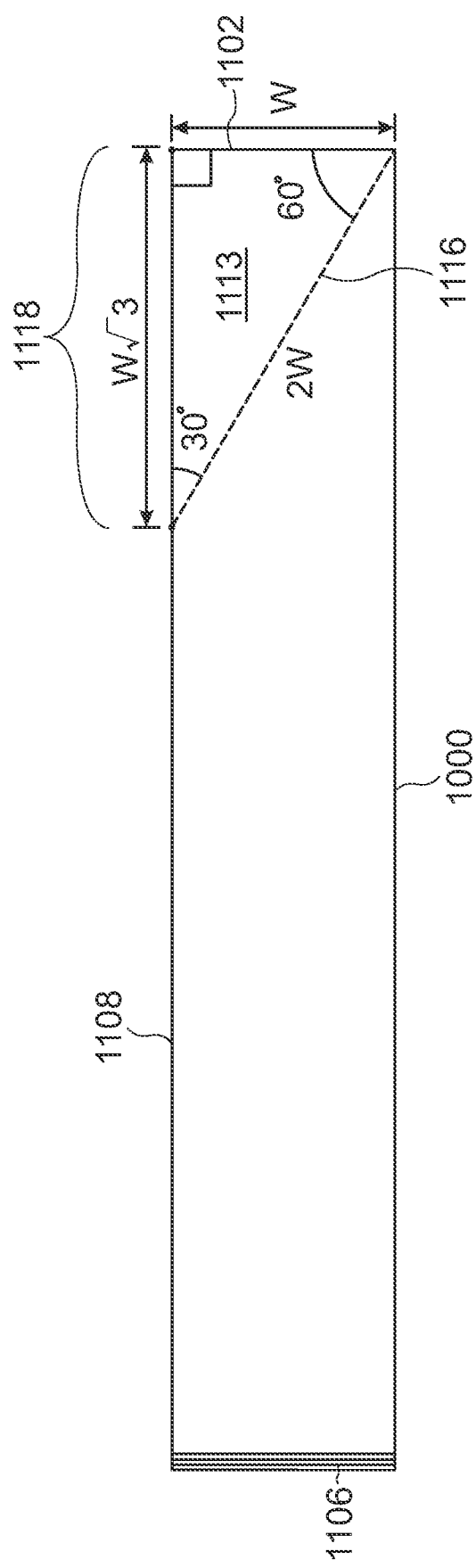

At step 1025, a triangular section of the folded material is defined, wherein the triangular section has a first side having length W formed from a short side of the folded material, a second side formed from a portion of a long side of the folded material, the portion having length W√3, and a hypotenuse having length 2W, wherein the intersection of the first side and the hypotenuse forms a 60 degree angle, and the intersection of the second side and the hypotenuse forms a 30 degree angle. The angles described herein are examples and are not limiting. Other angles may be used. In the illustrative embodiment, a triangular section 1113 is defined on folded material 1000, as shown in FIG. 11F. A first side of triangular section 1113 is formed from short side 1102 (which has length W). A second side of triangular section 1113 is formed from a portion 1118 of long side 1108; the portion 1118 has length W√3. The hypotenuse 1116 of triangular section 1113 has length 2W. The intersection of side 1102 and the hypotenuse 1116 forms a 60 degree angle. The intersection of portion 1118 of side 1108 and the hypotenuse 1116 forms a 30 degree angle.

Figure 11G:
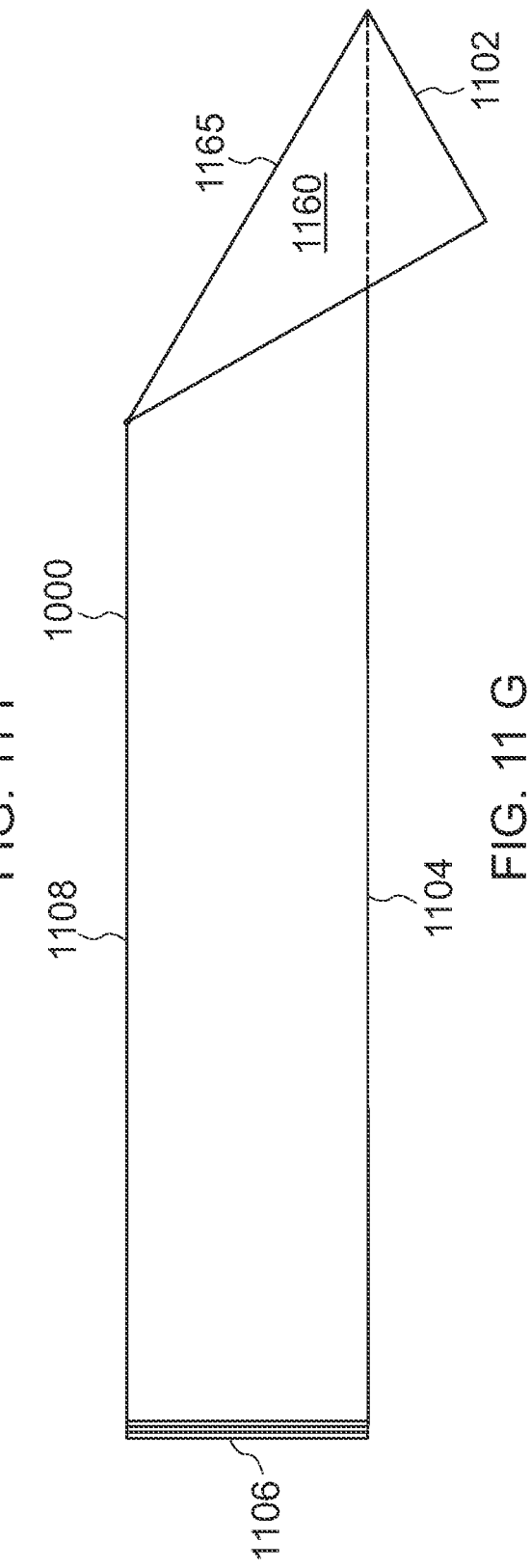
Figure 11:
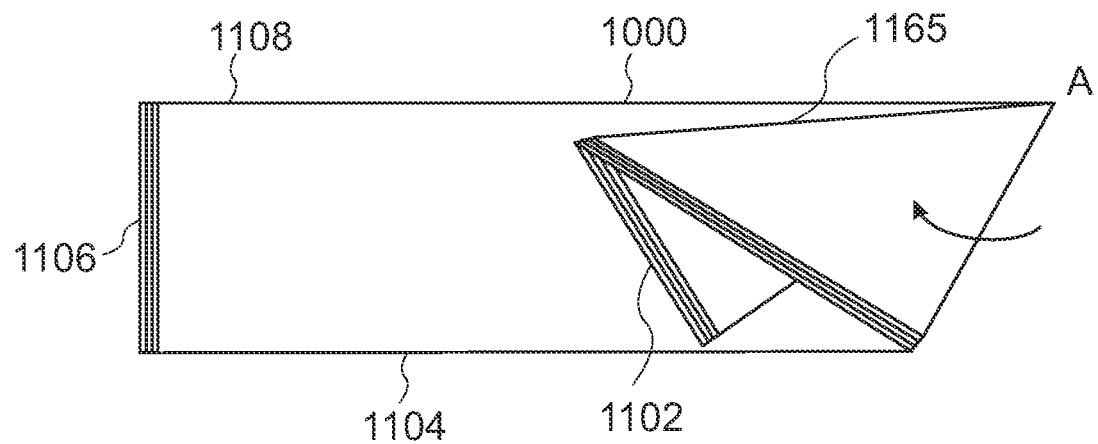
Figure 11:
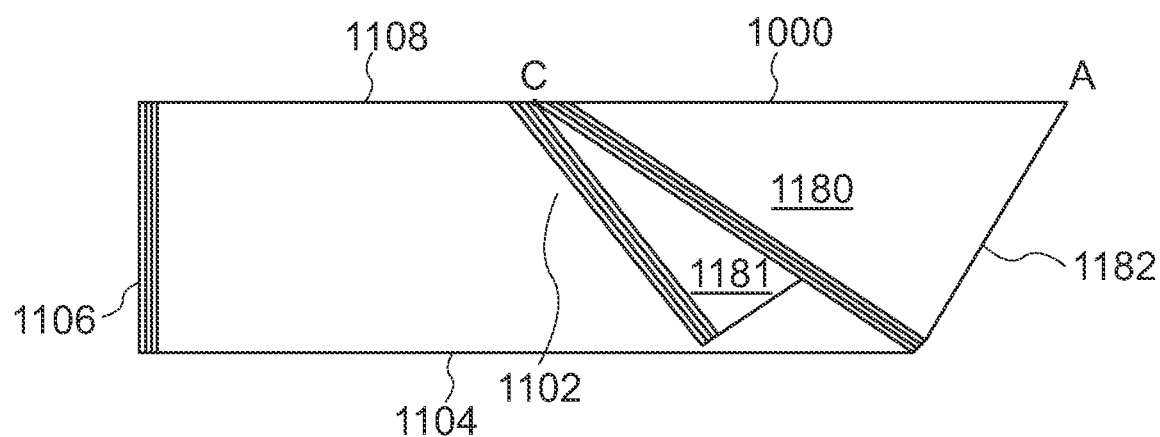
Figure 11:
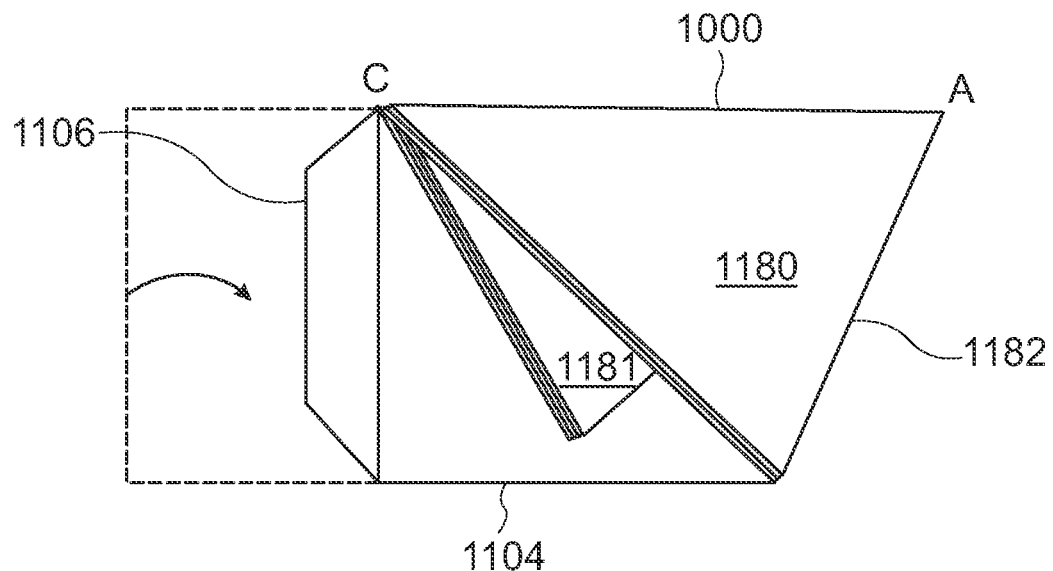
Figure 11:
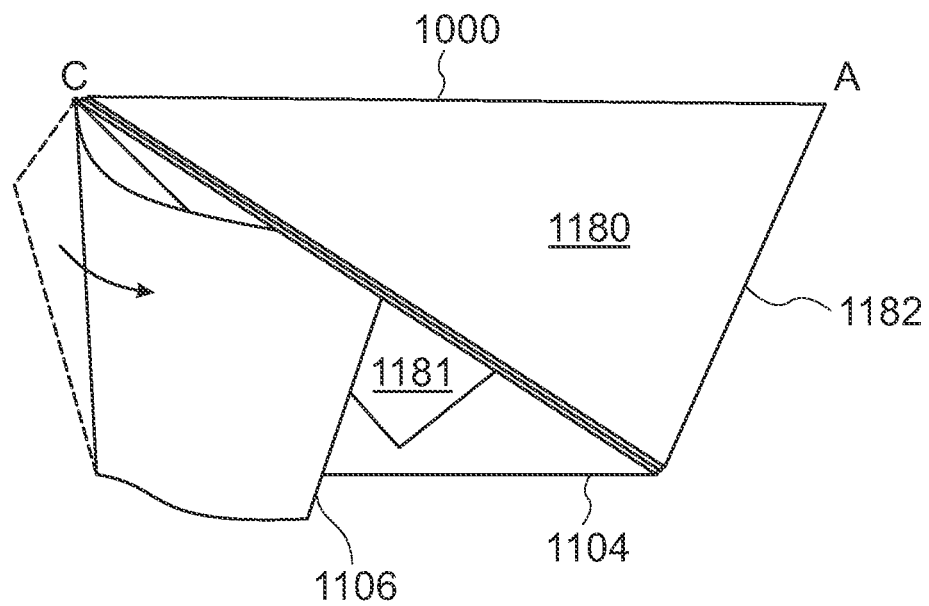
Figure 11:
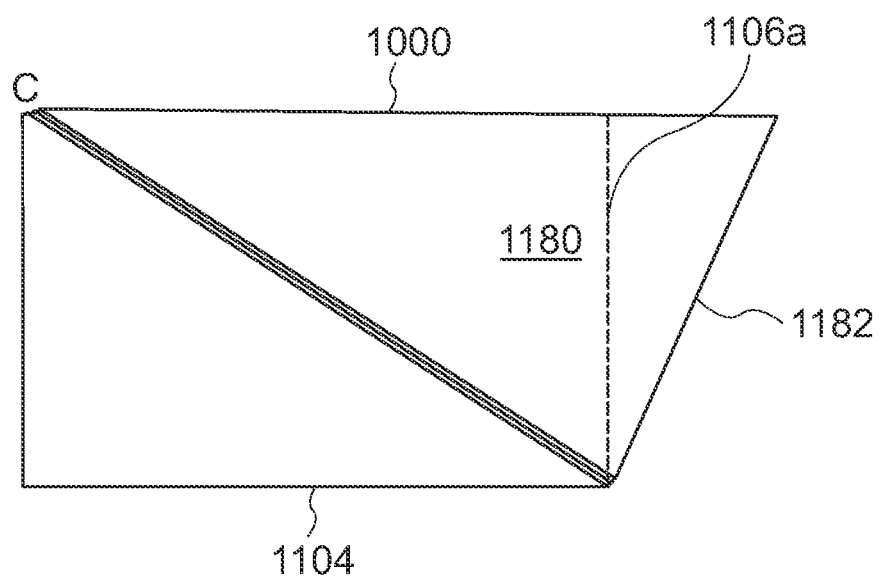

At step 1030, the triangular section is folded over along the hypotenuse of the triangular section, to form a first folded-over section. Thus, triangular section 1113 is folded over along hypotenuse 1116 to form first folded-over section 1160, as shown in FIG. 11G. First folded-over section 1160 has a first side 1165 (congruent with hypotenuse 1116) which now forms a diagonal edge of folded material 1000, and a second edge formed from short side 1102. Diagonal edge 1165 intersects the lines formed by long sides 1108 and 1104.

At step 1035, the first folded-over section is folded over so that the diagonal edge of the first folded-over section aligns with a long side of the folded material, to form a second folded-over section. In the illustrative embodiment, first folded-over section 1160 is folded over so that diagonal edge 1165 aligns with long side 1108 of folded material 1000, forming vertex A, as shown in FIG. 11H. FIG. 11I shows folded material 1000 after first folded-over section 1160 has been folded over to align edge 1165 with long side 1108, marking the location of vertex C. A second folded-over section 1180 having a first portion 1181 and a second portion 1182 is now defined. First portion 1181 includes an inner set of layers and second portion 1182 includes an outer set of layers. The inner set of layers includes four layers of material. The outer set of layers also includes four layers of material. In other embodiments, the inner set of layers and the outer set of layers may include more or fewer than four layers of material.

At step 1040, a second short side of the folded material opposite the second folded-over section is folded over and inserted between the outer set of layers and the inner set of layers of the second folded-over section. In the illustrative embodiment, short side 1106 of folded material 1000 is folded over toward the second folded-over section 1180, as shown in FIG. 11J. As shown in FIG. 11K, short side 1106 is inserted between the inner layers of portion 1181 and the outer layers of second folded-over section 1180 and forming vertex C. FIG. 11L shows folded material 1000 after short side 1106 has been inserted between the inner layers of portion 1181 and the outer layers of second folder-over section 1180. The dotted lines 1106*a* illustrate the outline of short side 1106 therein.

Folded material 1000 is now a completed cup sleeve similar to that shown in FIGS. 1-6 and cup sleeve 100.

In another embodiment, a cup sleeve may be formed using a mirror image of the steps described herein starting from opposite sides of the folded material. In other embodiments, other methods of folding material to form a cup sleeve similar to that described herein may be used.

Advantageously, the inventive cup sleeve is pre-assembled as a cup sleeve but can be easily unfolded and used as a napkin or paper towel. This feature allows the cup sleeve to be used to clean spills or to be used as a coaster to soak up condensation from iced drinks. This feature offers advantages relating to convenience and ease-of-use as well as environmental benefits.

Advantageously, the inventive cup sleeve has increased thickness under the user's open palm, providing improved insulation properties. For example, referring to FIGS. 11I-11L, a substantial portion of triangular section 1180 in the completed cup sleeve has 12 layers (twelve-ply), including the four outer layers of portion 1180, the four layers associated with short end 1106, and the four inner layers of portion 1181. In other embodiments, portions of section 1180 may have a different thickness and/or a different number of layers of material.

The inventive cup sleeve offers additional benefits. Advantageously, the inventive cup sleeve does not use glue or any other adhesive. This includes no use of tabs, clips, elastic bands, snaps, staples or any other method of securing. Advantageously, the cup sleeve provides a self-locking feature. Because a short end of the folded paper towel is sandwiched between the inner layers and outer layers of the folded triangular section, when the cup sleeve is placed snugly around a cup, the short end is squeezed between the inner and outer layers, locking the ends in place. Tension strength increases as the sleeve is slid up a tapered container preventing the two ends from coming apart while affixed to a food container. Friction also prevents the sleeve from coming apart. This also ensures a snug fit around the cup preventing the sleeve from sliding down without the use of glue or adhesive. When in this position with a cup inserted, it is extremely difficult for the ends to become undone. When the cup is removed, the cup sleeve can be unfolded effortlessly into a napkin by removing the short end from the folded triangular section. Cup sleeve 100 also does not unfold or come apart on its own when in the closed or open positions.

Also, advantageously, the cup sleeve may be removed from the cup, unfolded and used as a napkin or paper towel. Thus, the cup sleeve has multiple uses, unlike other existing cup sleeves. This is also advantageous as it compliments the need for a napkin with the use of food related items.

Advantageously, the inventive cup sleeve does not unfold on its own. The cup sleeve retains its structure until being unfolded by user.

Advantageously, the cup sleeve can also be used for iced beverages. Most iced beverage containers are constructed out of thin materials such as waxed paper, recyclable PET plastic or compostable PLA making the sidewall of these drinks extremely flexible and flimsy. As the cold liquid inside the cup reacts with the warm air outside, significant condensation is formed making the sidewall slippery and difficult to grip. An absorbent sleeve will soak up condensation while providing sturdiness and a better gripping surface.

Advantageously, the cup sleeve is constructed using less material than most existing cup sleeves or double-walled insulated disposable cups. The cup sleeve may be constructed from a paper towel material, which is a lower-density material than paper board used in other cup sleeves. This feature is advantageous because the cup sleeve is lighter, thus reducing shipping costs, for example. The lower-density material may also provide further advantages as it is more environmentally friendly with lower environmental costs relating to manufacturing, shipping or waste.

In other embodiments, cup sleeve 100 may also be adjusted onto a bowl or other container. For example, by lengthening end 1106 from overlapping fold 1180, the circumference of the cup sleeve can be elongated in order to fit larger sized cups and bowls. Alternatively, end 1106 can be folded over itself and tucked farther under fold 1180 in order to decrease the circumference to fit around smaller cups and cones. This adjustable feature is not a feature of alternatives that have a predetermined and fixed circumference.

Figure 12:
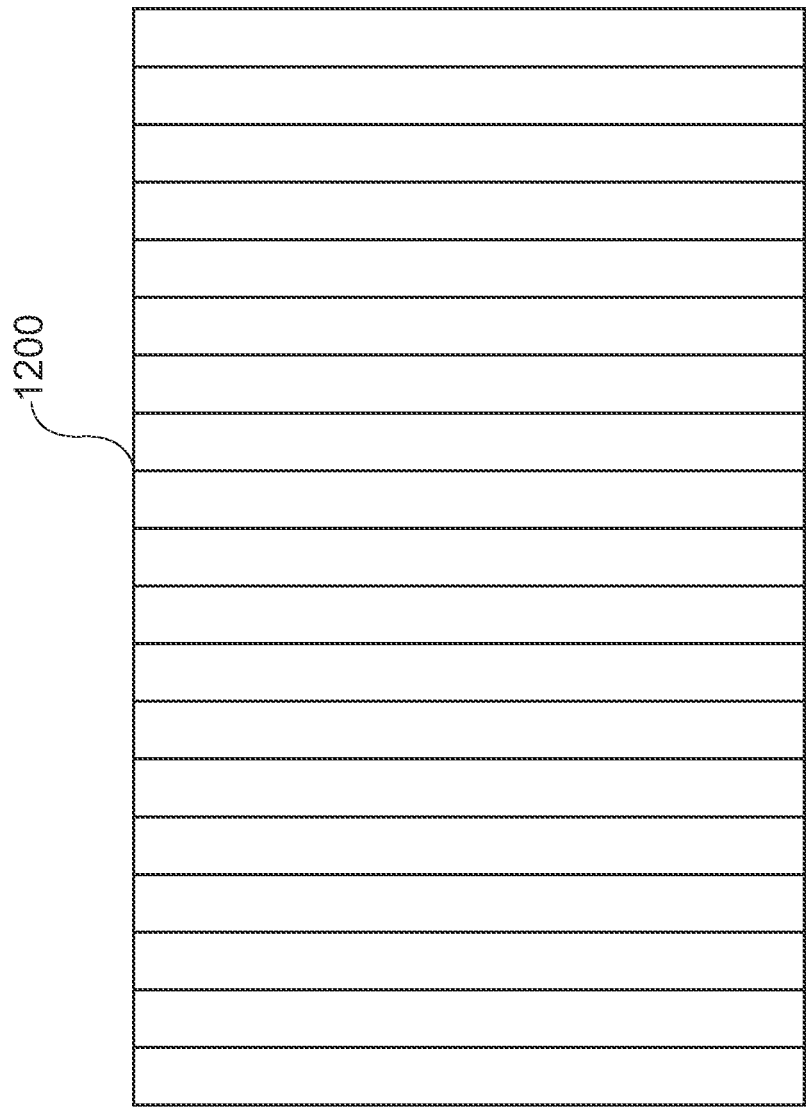
FIG. 12 shows a material having a textured pattern with raised grooves in accordance with an embodiment.

In other embodiments, a material having textured properties may be used. For example, FIG. 12 shows a material 1200 having a textured pattern with raised grooves in accordance with an embodiment. Material 1200 may be a paper towel, for example.

Figure 13:
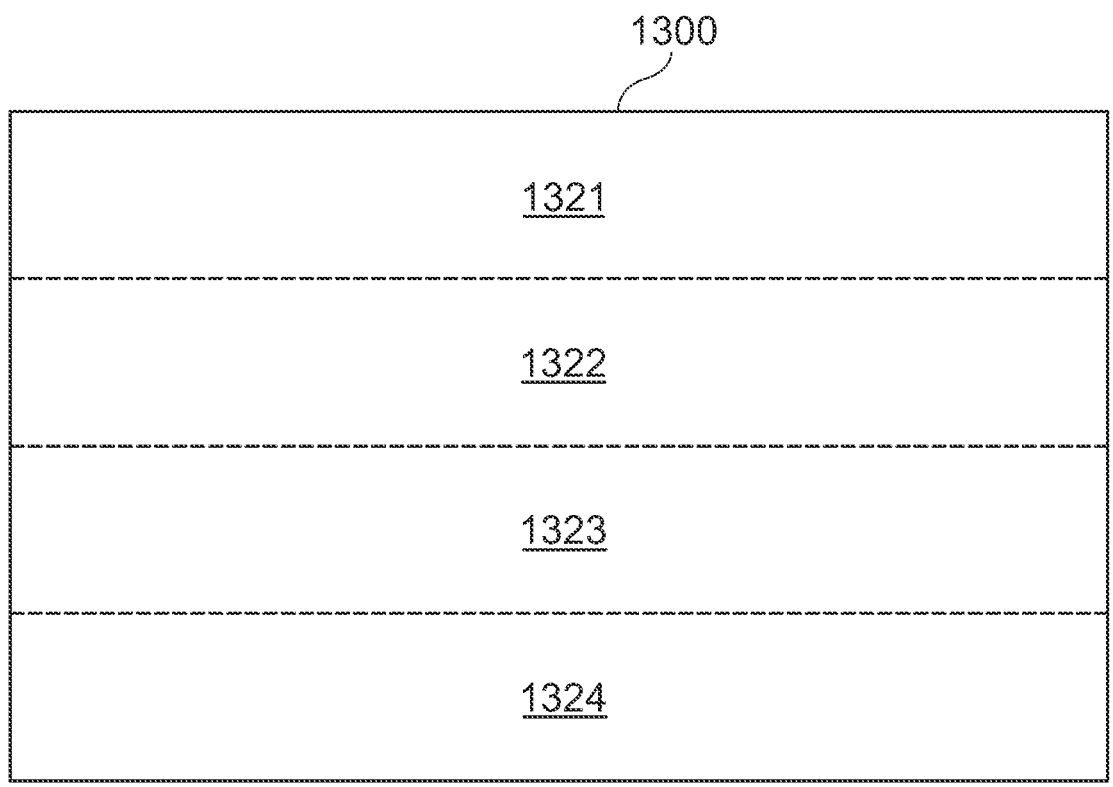
FIGS. 13A-13D show another method of folding a material to produce a folded material having four layers (four-ply) in accordance with an embodiment.
Figure 13:
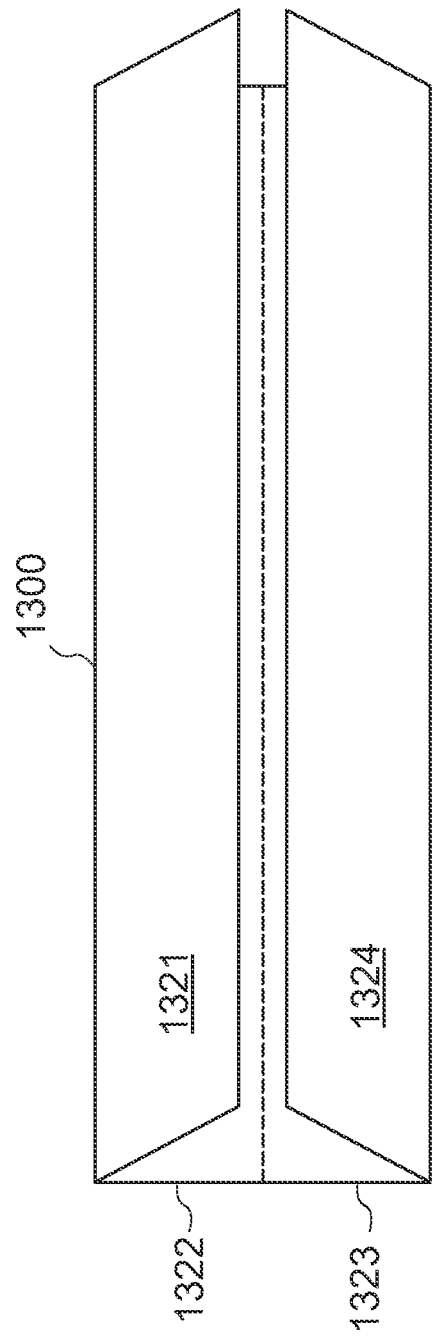
Figure 13:
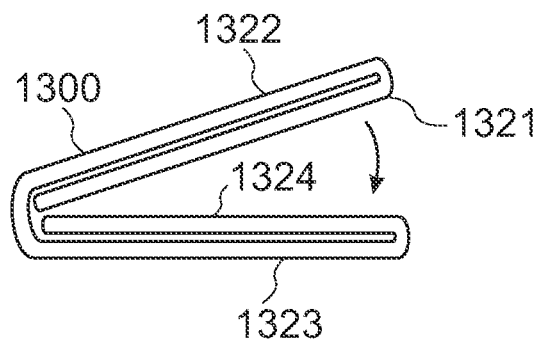
Figure 13:
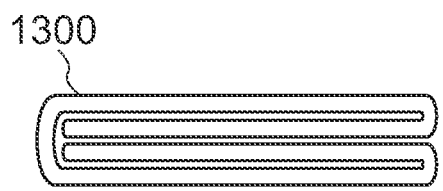

In other embodiments, a material may be folded using other methods to produce a folded material with two long sides and two short sides to be used for Cup Sleeve 100. FIGS. 13A-13D show a different method of folding a material to produce a folded material having four layers (four-ply) in accordance with an embodiment. Referring to FIG. 13A, four sections 1321, 1322, 1323, and 1324 are defined on a material 1300. Referring to FIG. 13B, section 1321 is folded over section 1322, and section 1324 is folded over section 1323. Referring to FIG. 13C, sections 1321 and 1322 are folded over sections 1323 and 1324. FIG. 13D shows the resulting folded material having four layers and a thickness equal to four times the thickness of the original material (four-ply).

Figure 14:
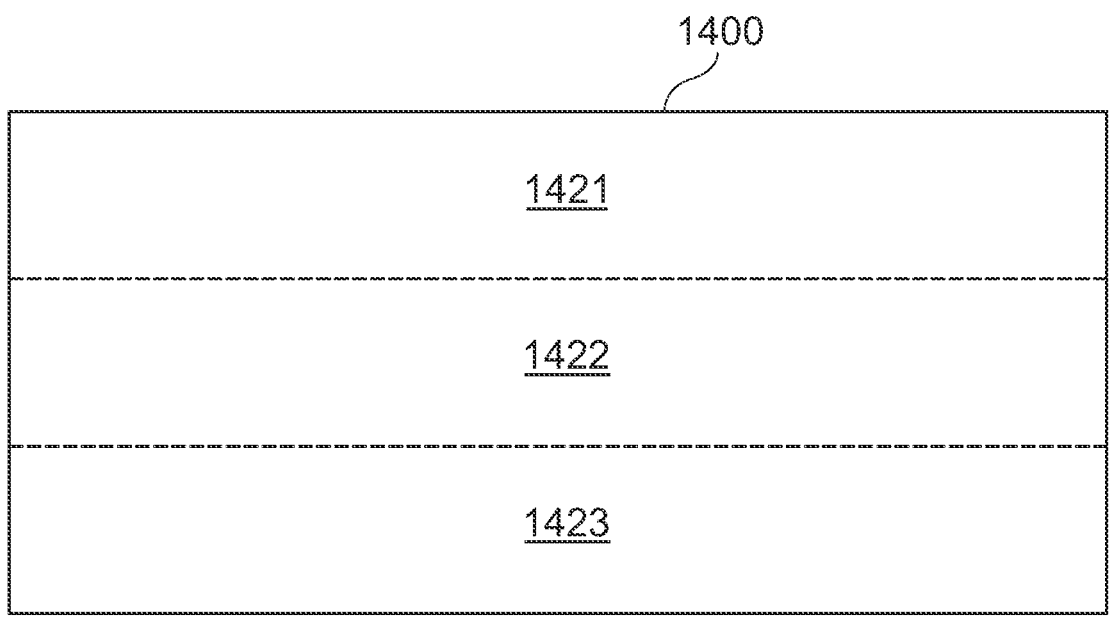
FIGS. 14A-14D show a method of folding a material to produce a folded material having three layers (three-ply) in accordance with an embodiment.
Figure 14:
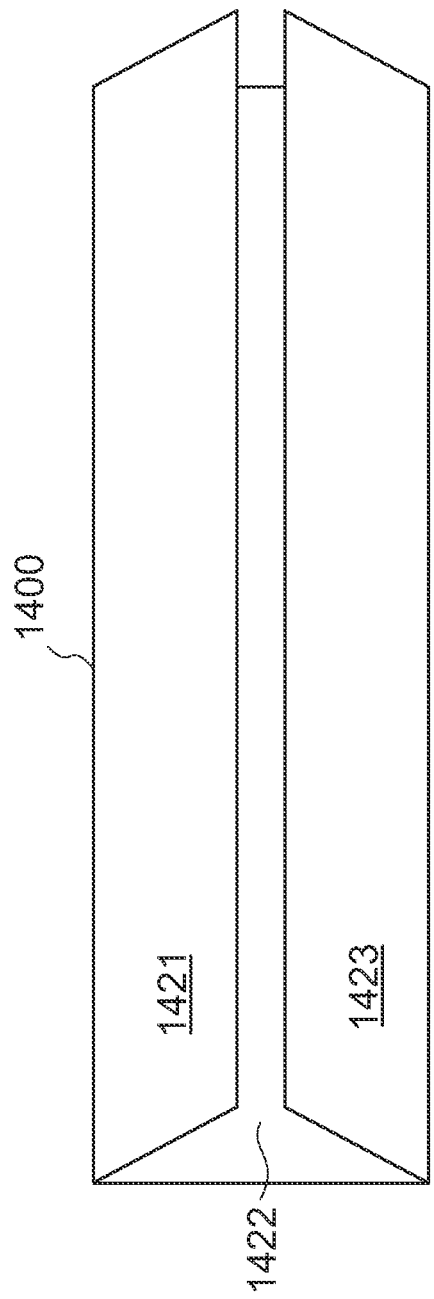
Figure 14C:
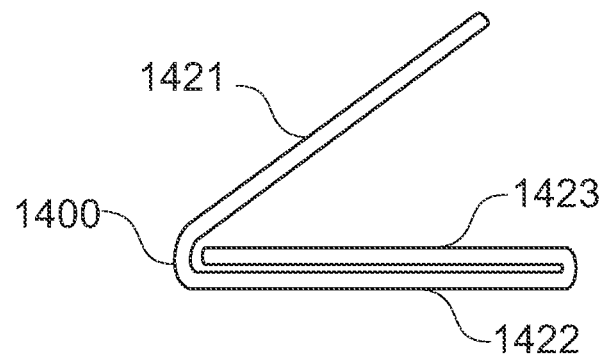
Figure 14D:
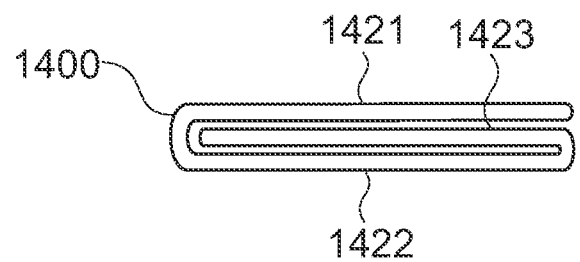

FIGS. 14A-14D show a method of folding a material to produce a folded material having three layers (three-ply) in accordance with an embodiment. Referring to FIG. 14A, three sections 1421, 1422, and 1423 are defined on a material 1400. Referring to FIG. 14B, sections 1421 and 1423 are folded relative to section 1422. Referring to FIG. 14C, section 1423 is folded over section 1422, and then section 1421 is folded over section 1423. FIG. 14D shows the resulting folded material having three layers and a thickness equal to three times the thickness of the original material (three-ply).

All dimensions and shapes described herein are merely examples. In other embodiments, other dimensions, and other shapes, may be used.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A cup sleeve comprising:
a sheet of material folded into an annular shape adapted to engage with an outer circumference of a cup, the sheet of material being flexible and adapted to provide thermal protection,
wherein the sheet of material is folded into the annular shape such that a first section of the cup sleeve has a first number of overlapping layers of the sheet of material, and a second section of the cup sleeve has a second number of overlapping layers of the sheet of material that is three times the first number of layers,
wherein, when in the annular shape, a first lateral end portion of the sheet of material is folded over a side edge of a second lateral end portion of the sheet of material such that a terminal end portion of the second lateral end portion is positioned between an outer portion of the first lateral end portion of the sheet of material and an inner portion of the first lateral end portion of the sheet of material, and
wherein the terminal end portion of the second lateral end portion, the outer portion of the first lateral end portion of the sheet of material and the inner portion of the first lateral end portion of the sheet of material overlap each other and form the second section of the cup sleeve.

2. The cup sleeve according to claim 1, wherein the cup sleeve is void of an adhesive material to retain the sheet of material in the annular shape while engaged with the outer circumference of the cup.

3. The cup sleeve according to claim 1, wherein, when in the annular shape and engaged with the outer circumference of the cup, the cup sleeve defines an upper edge having a first point and a second point, the second point being higher than the first point.

4. The cup sleeve according to claim 3, wherein the first point and the second point are positioned at substantially opposing sides of the annular shape.

5. The cup sleeve of claim 1, wherein the sheet of material comprises a liquid absorbent material.

6. The cup sleeve according to claim 1, wherein the sheet of material has textured properties.

7. The cup sleeve of claim 1, wherein the sheet of material has a length between 12 and 14 inches and a width between 8 and 11 inches in an unfolded configuration.

8. The cup sleeve according to claim 1, wherein the sheet of material comprises a plurality of overlapping layers formed by the sheet being folded over upon itself.

9. The cup sleeve of claim 1, wherein the cup sleeve is adapted to be unfolded from the annular shape into an open arrangement.

10. The cup sleeve according to claim 9, wherein, in the open arrangement, the sheet of material is adapted as a liquid absorbent paper towel or napkin.

11. The cup sleeve of claim 1, wherein the second section comprises:
a first portion of the sheet of material folded over itself such that it comprises an outer set of layers of the sheet of material and an inner set of layers of the sheet material; and
a second portion of the sheet material inserted between the outer set of layers and the inner set of layers.

12. The cup sleeve according to claim 1, wherein the sheet of material has dimensions of $L=2(W\sqrt{3})+2W$, wherein L is its total length and W is a total width of the sheet of material.

13. The cup sleeve according to claim 1, wherein, when in the annular shape, the first lateral end portion of the sheet of material is folded over the edge of the second lateral end portion of the sheet of material along a fold line that is angled away from a terminal end of the first lateral end portion as the fold line extends from a top edge to a bottom edge, or from a bottom edge to a top edge, of the sheet of material.

14. The cup sleeve according to claim 1, wherein, when in the annular shape and engaged with the outer circumference of the cup, the cup sleeve defines a bottom edge having a first point and a second point, the second point being higher than the first point.

15. The cup sleeve according to claim 14, wherein, when in the annular shape and engaged with the outer circumference of the cup, the cup sleeve defines a top edge having a third point and a fourth point, the fourth point being higher than the third point.

16. The cup sleeve according to claim 15, wherein the first and third points are positioned at a substantially opposing side of the annular shape than the second and fourth points.

17. The cup sleeve according to claim 1, wherein, when in the annular shape, the cup sleeve defines an inner cavity of a conical shape with a top end being larger and than a bottom end.

18. The cup sleeve according to claim 1, wherein the side edge of the second lateral end portion of the sheet of material is a top edge of the sheet of material.

19. A method of making a cup sleeve, comprising:
folding a sheet of material into an annular shape that is adapted to engage with an outer circumference of a cup, the sheet material being flexible and adapted to provide thermal protection, and
wherein the folding of the sheet of material into the annular shape comprises forming a first section of the cup sleeve with a first number of overlapping layers of the sheet of material, and forming a second section of the cup sleeve with a second number of overlapping layers of the sheet of material that is three times the first number of layers, and
wherein forming the second section of the cup sleeve comprises folding a first lateral end portion of the sheet of material over an edge of a second lateral end portion of the sheet of material such that a terminal end portion of the second lateral end portion is positioned between an outer portion of the first lateral end portion of the sheet of material and an inner portion of the first lateral end portion of the sheet of material.

* * * * *